United States Patent
Park et al.

(10) Patent No.: US 6,678,027 B2
(45) Date of Patent: Jan. 13, 2004

(54) FRINGE FIELD SWITCHING MODE LCD

(75) Inventors: Chi Hyuck Park, Kyoungki-do (KR); Jin Mahn Kim, Kyoungki-do (KR); Seung Hee Lee, Kyoungki-do (KR); Seung Ho Hong, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 212 days.

(21) Appl. No.: 09/894,937

(22) Filed: Jun. 28, 2001

(65) Prior Publication Data

US 2002/0008828 A1 Jan. 24, 2002

(30) Foreign Application Priority Data

Jun. 29, 2000 (KR) ........................................ 2000-36598

(51) Int. Cl.$^7$ ............................................. G02F 1/1343
(52) U.S. Cl. ........................................ 349/141; 349/128
(58) Field of Search .................................. 349/141, 128

(56) References Cited

U.S. PATENT DOCUMENTS

| | | | | |
|---|---|---|---|---|
| 6,233,034 B1 | * | 5/2001 | Lee et al. | 349/141 |
| 6,256,081 B1 | * | 7/2001 | Lee et al. | 349/141 |
| 6,351,300 B1 | * | 2/2002 | Park et al. | 349/141 |
| 6,452,658 B1 | * | 9/2002 | Park et al. | 349/141 |
| 6,466,290 B2 | * | 10/2002 | Kim et al. | 349/141 |
| 6,522,380 B2 | * | 2/2003 | Lee et al. | 349/141 |
| 2002/0044248 A1 | * | 4/2002 | Park et al. | 349/141 |

FOREIGN PATENT DOCUMENTS

| | | | | |
|---|---|---|---|---|
| GB | 2325751 A | * | 12/1998 | G02F/1/1343 |
| KR | 99086580 A | * | 12/1999 | G02F/1/1337 |
| KR | 2000014693 A | * | 3/2000 | G02F/1/1335 |

* cited by examiner

*Primary Examiner*—Erik Kielin
(74) *Attorney, Agent, or Firm*—Ladas & Parry

(57) ABSTRACT

Disclosed is a fringe field switching mode LCD comprising an upper and a lower substrates opposed to each other with a predetermined distance; a liquid crystal layer interposed between the substrates, comprising liquid crystal molecules of positive dielectric anisotropy; a transparent counter electrode formed on the inner surface of lower substrate; a transparent pixel electrode formed on the inner surface of the lower substrate, forming a fringe field with the counter electrode to drive most of liquid crystals; and a horizontal alignment layer interposed between the substrates and liquid crystal layer, having a predetermined rubbing axis, wherein a retardation of the liquid crystal layer is 0.3 to 0.45 μm.

7 Claims, 2 Drawing Sheets

FRINGE FIELD SWITCHING MODE LCD

BACKGROUND OF THE INVENTION

1. Field of the Invention

The present invention relates to a fringe field switching mode LCD and, more particularly, to a fringe field switching mode LCD obtaining a maximum transmittance while using liquid crystal layers of positive dielectric anisotropy.

2. Description of the Related Art

An IPS (In-Plane Switching) mode LCD has been proposed in order to overcome low viewing angle of TN (Twisted Nematic) mode LCD. The IPS mode LCD has a structure that an upper and a lower substrates are arranged opposite to each other with a predetermined distance. A liquid crystal layer comprising a plurality of liquid crystal molecules is interposed between the substrates.

Here, pixel and counter electrodes, comprising opaque materials, are formed on the lower substrate to drive liquid crystal molecules and separated with a distance longer than that between the upper and lower substrates to form a parallel electric field. And also the pixel and counter electrodes have relatively large width to maintain a constant electric intensity. And, horizontal alignment layers are respectively interposed between upper and lower substrates and liquid crystal layer.

This IPS mode LCD has an improved viewing angle since liquid crystal molecules are arranged in parallel with a substrate. However, it has a disadvantage of low transmittance.

In order to overcome the low transmittance of IPS mode LCD, a fringe field switching mode LCD (hereinafter referred to as FFS-LCD) has been proposed. The FFS-LCD has pixel and counter electrodes made from transparent conductors and the distance between the electrodes are narrower than the distance between the upper and lower substrates to form a fringe field on the electrodes.

The conventional fringe field switching mode LCD will be described in detail with reference to FIG. 1.

FIG. 1 is a cross-sectional view of conventional fringe field switching mode LCD.

Referring to FIG. 1, a lower substrate 1 and an upper substrate 10 are arranged opposite to each other with a predetermined distance (d: hereinafter referred to as cell gap).

And, a liquid crystal layer 15 is interposed between the lower substrate 1 and the upper substrate 10. The liquid crystal layer 15 comprises a plurality of liquid crystal molecules of positive or negative dielectric anisotropy.

A retardation, that is a result of multiplying cell gap d and refractive anisotropy Δn, is preferably 0.25 to 0.35 μm to obtain maximum transmittance.

Although it is not shown in the drawings, a gate bus line and a data bus line are crossed on the lower substrate 1 to define a unit pixel and a thin film transistor (not shown) is disposed at the intersection of the lines.

And, a counter electrode 3 is formed in the unit pixel of the lower substrate 1. The counter electrode 3 comprises a transparent ITO (Indium Tin Oxide) layer and has a shape of slant or a plate.

A gate insulating layer 4 is formed on the upper part of the counter electrode 3 in a slant shape to overlap with the counter electrode 3. The distance between the counter electrode 3 and the pixel electrode 5 is narrower than cell gap d.

And, a horizontal alignment layer 6 is formed on the surface of the resulting lower substrate 1 to control initial arrangement of liquid crystal molecules. The horizontal alignment layer 6 has a rubbing axis to a predetermined direction and a predetermined pretilt angle.

On the other hand, a color filter 12 is formed on an upper substrate 10 opposite to the lower substrate 1. A horizontal alignment layer 14 is also formed on the surface of the color filter 12 to control initial arrangement of liquid crystal molecules. The horizontal alignment layer 14 also has a predetermined pretilt angle and a rubbing axis forming an angle of 180° with that on the lower substrate.

The conventional FFS-LCD operates in a following method. First, when voltage differences are generated between a counter electrode 3 and pixel electrode 5, a fringe field is formed since the distance between the electrodes is narrower than cell gap d. The fringe field has influence on the upper parts of the counter electrode 3 and of pixel electrode 5 since the counter electrode 3 has a narrow open space between pixel electrodes 5, thereby driving most of liquid crystal molecules in a unit pixel. As a result, transmittance and aperture ratio are improved.

Generally, a conventional FFS-LCD employs liquid crystals of both positive and negative dielectric anisotropy as a liquid crystal layer. However, liquid crystals of negative dielectric anisotropy are preferred due to rapid response speed. And, the value of retardation is determined to obtain a maximum transmittance when using liquid crystals of negative dielectric anisotropy. Accordingly, when liquid crystals of positive dielectric anisotropy are used as the liquid crystal layer, it is difficult to obtain a maximum transmittance since the retardation conditions are not sufficient.

SUMMARY OF THE INVENTION

Therefore, the present invention has been made in order to solve the above-mentioned problems in the prior art. An object of the present invention is to provide a FFS-LCD to obtain a maximum transmittance while using liquid crystals of positive dielectric anisotropy.

In order to achieve the above object, the present invention comprises:

an upper and a lower substrates opposed to each other with a predetermined distance; a liquid crystal layer interposed between the substrates, comprising liquid crystal molecules of positive dielectric anisotropy, wherein a retardation of the liquid crystal layer is 0.3 to 0.5 μm; a counter electrode disposed on the inner surface of the lower substrate; a pixel electrode disposed on the inner surface of the lower substrate, forming a fringe field with the counter electrode to drive liquid crystal molecules; and a horizontal alignment layer interposed between the upper and the lower substrates and liquid crystal layer, having a predetermined rubbing axis.

DETAILED DESCRIPTION OF THE INVENTION

The preferred embodiment of the present invention will be described in detail referring to the attached drawings.

Figure 1:
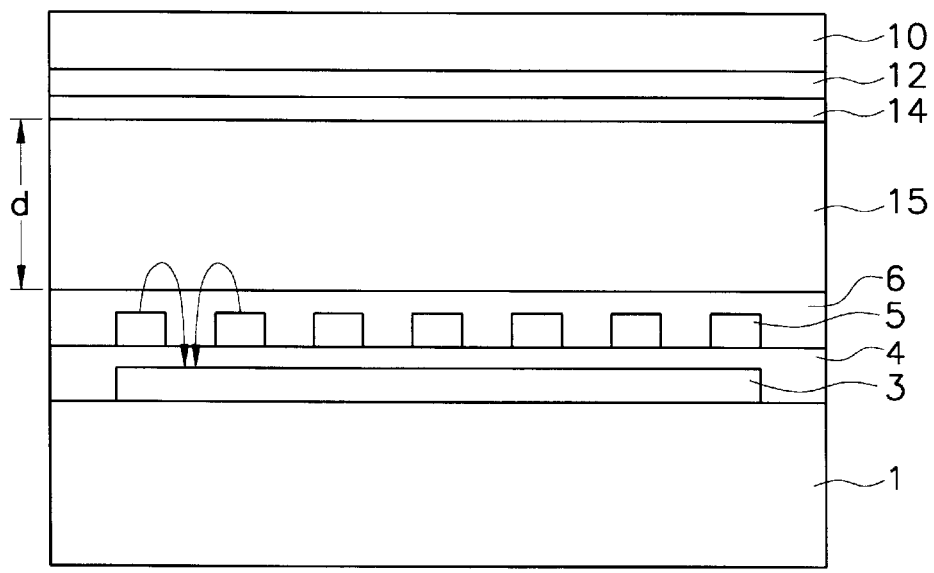
FIG. 1 is a cross-sectional view of conventional fringe field switching mode LCD.
Figure 2:
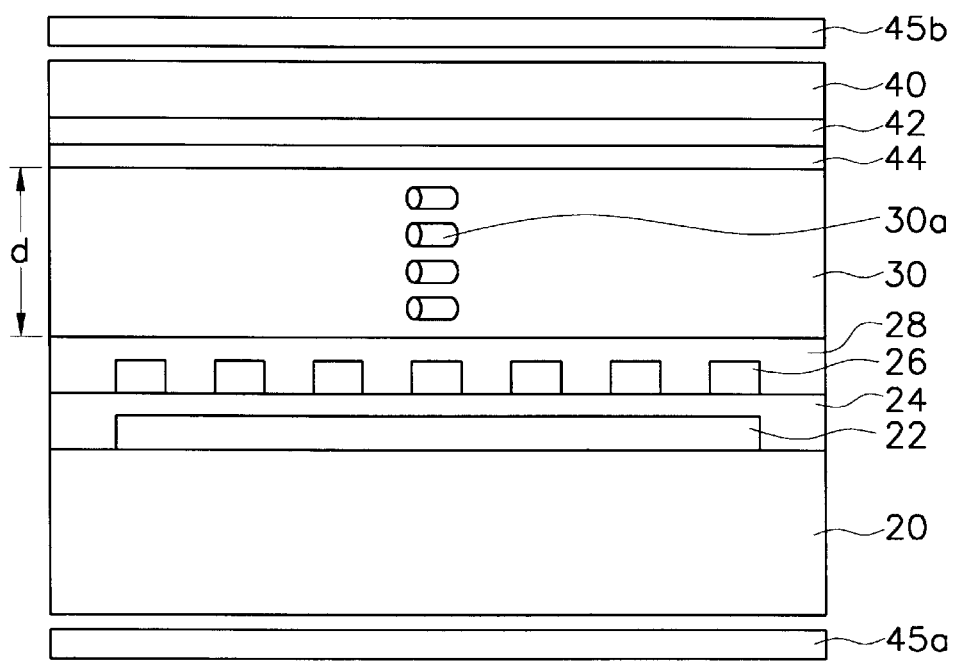
FIGS. 2 and 3 are cross-sectional views of FFS-LCD according to the present invention.
Figure 3:
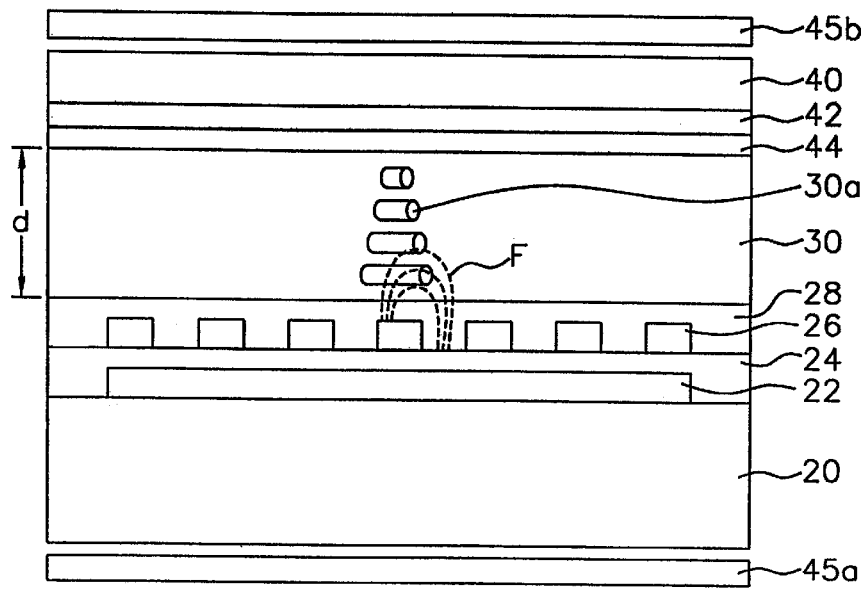
Figure 4:
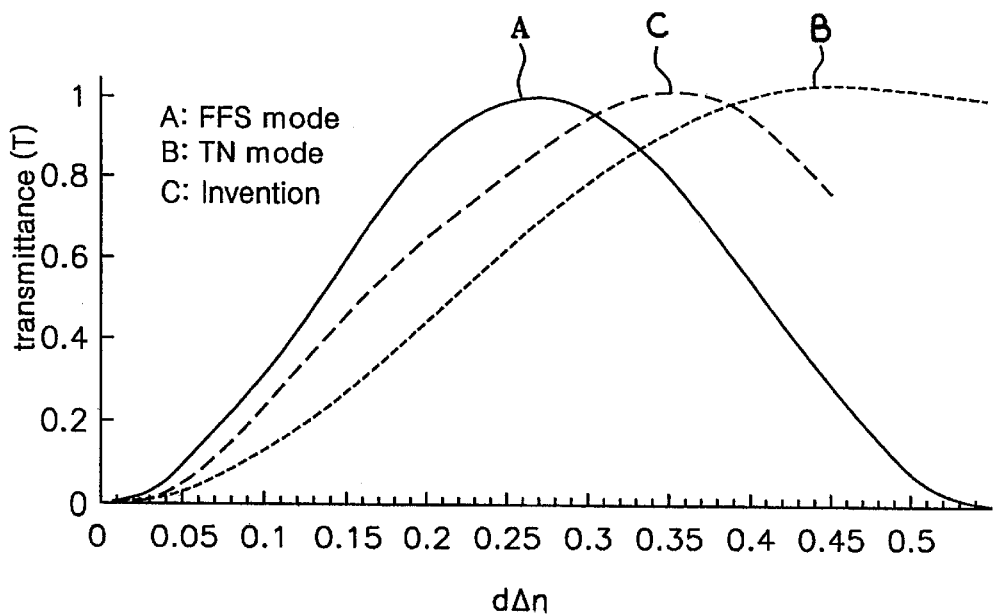
FIG. 4 is a graph showing the change of transmittance according to retardation in a conventional FFS-LCD, a FFS-LCD employing a liquid crystal layer of positive dielectric anisotropy, and a TN-LCD.

FIGS. 2 and 3 are cross-sectional views of FFS-LCD according to the present invention and FIG. 4 is a graph showing the change of transmittance according to retardation in a conventional FFS-LCD, a FFS-LCD employing a liquid crystal layer of positive dielectric anisotropy according to the present invention and a TN-LCD.

Referring to FIGS. 2 and 3, a FFS-LCD of the present invention comprises a lower substrate 20 and an upper substrate 40 opposed to each other with a predetermined distance (d: hereinafter referred to as cell gap). In a preferred embodiment, a cell gap d is 2 to 6 µm.

And, a liquid crystal layer 30 is interposed between the lower and upper substrates 20 and 40, comprising a plurality of liquid crystal molecules 30a. The liquid crystal molecules 30a have a positive dielectric anisotropy of 4 to 15.

Although it is not shown in the drawings, a gate bus line and a data bus line are crossed on the lower substrate 20 to define a unit pixel. And, a thin film transistor (not shown) is disposed at the intersection of the lines. In the unit pixel of the lower substrate 20, a counter electrode 22 is formed in a slant or plate shape, comprising a transparent conductive ITO layer. In the preferred embodiment, it is formed in a plate shape.

And, a gate insulating layer 24 is formed on the lower substrate 20 which has formed the counter electrode 22 thereon. And, a pixel electrode 26 is formed on the gate insulating layer 24 in a slant shape to overlap with the counter electrode 22. A distance 1 between the counter electrode 22 and the pixel electrode 26 is narrower than a cell gap d, thereby forming a fringe field between the electrodes 22 and 26.

In addition, a first horizontal alignment layer 28 is formed on the surface of the resulting lower substrate 20 to control initial arrangement of liquid crystal molecules. In order to obtain a maximum transmittance, the first horizontal alignment layer 28 has a rubbing axis forming an angle of 45 to 90°, preferably, 60 to 85° with a substrate projected line of fringe field to be formed between the counter electrode 22 and the pixel electrode 26.

On the other hand, a color filter 42 is formed on the opposite surface of upper substrate 40 corresponding to the lower substrate 20. On the surface of the color filter 42 is formed a second horizontal alignment layer 44 having a rubbing axis forming a predetermined angle with that of the first horizontal alignment layer 28, for example, 180°.

And, a polarizer 45a is attached on the outer surface of lower substrate 20 for linear polarization of light coming from a backlight (not shown) and a decomposer 45b is attached on the outer surface of upper substrate 40 for selective absorption and transmission of light passing through a liquid crystal layer 30. Here, the polarizer 45a has a polarization axis (not shown) parallel with a rubbing axis of the first horizontal alignment layer 28 and the decomposer 45b has an absorption axis (not shown) perpendicular to the polarization axis.

According to the present invention, a fringe field switching mode LCD operates as follows.

First, as shown in FIGS. 2 and 3, when an electric field is not formed between the count electrode 22 and the pixel electrode 26, liquid crystal molecules 30a of positive dielectric anisotropy are arranged, the major axes thereof being parallel with rubbing axes of the first and the second horizontal alignment layers 28 and 44.

Accordingly, a proceeding direction of light is not changed in passing through the liquid crystal layer 30 since the major axis is parallel with the rubbing axis. After passing through the liquid crystal layer 30, light is then absorbed by the decomposer 45b having the absorption axis perpendicular to the polarizing axis, therefore a screen becomes dark.

On the other hand, when voltage differences are generated between the counter electrode 22 and the pixel electrode 26, a fringe field F is formed.

Then, liquid crystal molecules 30a of positive dielectric anisotropy are arranged, the major axis thereof being parallel with the fringe field F. Therefore, light has suffered a change of polarizing state in passing through the liquid crystal layer 30. Accordingly, light is not absorbed by the decomposer 45b and consequently, the screen becomes white.

In a conventional LCD, liquid crystal molecules on the surface of alignment layer are arranged depending on the alignment layer due to anchoring force thereof, even if a electric field is formed.

However, in a FFS-LCD, a distance between the counter electrode 22 and the pixel electrode 26 is very narrow, thereby generating an intense electric field between the electrodes, particularly, on the surface of the first horizontal alignment layer 28.

Moreover, liquid crystal molecules of positive dielectric anisotropy are driven more actively since the major axis thereof is twisted in parallel with the electric field.

Therefore, when FFS-LCD employs a liquid crystal layer of positive dielectric anisotropy, even liquid crystal molecules 30a on the first horizontal alignment layer 28 are twisted in parallel with an electric field in applying an electric field.

As a result, different transmittances are obtained at even though the retardations are same in the liquid crystal layer of positive dielectric anisotropy and in that of negative dielectric anisotropy.

FIG. 4 shows a change of transmittance according to retardation. In more detail, "A" is a graph of transmittance according to retardation in a conventional FFS-LCD, "B" is in a TN-LCD and "C" is in a FFS-LCD employing liquid crystal layer of positive dielectric anisotropy.

Referring to FIG. 4, a conventional FFS-LCD has a maximum transmittance at a retardation of 0.2 to 0.3 µm, and TN-LCD has a maximum transmittance at a retardation of 0.4 to 0.5 µm.

In a FFS-LCD employing a liquid crystal layer of positive dielectric anisotropy, a maximum transmittance is obtained at a retardation of 0.3 to 0.45 µm, which is shifted to a TN-LCD graph B. This is because when a FFS-LCD employs liquid crystal layer of positive dielectric anisotropy, liquid crystal molecules on the surface of the first alignment layer 28 are driven.

As described above, according to the present invention, in a FFS-LCD employing a liquid crystal layer of positive dielectric anisotropy, a maximum transmittance is obtained at a retardation of 0.3 to 0.45 µm.

The invention may be embodied in other specific forms without departing from the spirit or essential characteristics thereof. The present embodiment is to be considered in all respects as illustrative and not restrictive. And all changes which come within the meaning and range of equivalency of the claims are thereof intended to be embraced therein.

What is claimed is:

1. A FFS-LCD comprising:

an upper and a lower substrates opposed to each other with a predetermined distance;

a liquid crystal layer interposed between the substrates, comprising liquid crystal molecules of positive dielectric anisotropy between 4 and 15, wherein the maximum transmittance is achieved when a retardation of the liquid crystal layer having the positive dielectric anisotropy is 0.3 to 0.45 μm and when the major axis of the positive anisotropic liquid crystal molecules is twisted parallel to the direction of and in the presence of a fringe field;

a counter electrode disposed on the inner surface of the lower substrate;

a pixel electrode disposed on the inner surface of the lower substrate, forming the fringe field with the counter electrode to drive the liquid crystal molecules;

a first horizontal alignment layer interposed between the lower substrates and the liquid crystal layer, having a predetermined rubbing axis; and a second horizontal alignment layer inter interposed between the upper substrate and the liquid crystal layer, having a predetermined rubbing axis.

2. A FFS-LCD according to claim 1, wherein the rubbing axis of the first horizontal alignment layers forms an angle of 45 to 90° with a substrate projected line of the fringe field formed between the counter and pixel electrodes.

3. A FFS-LCD according to claim 2, wherein the rubbing axis of the first horizontal alignment layers forms an angle of 60 to 80° with a substrate projected line of fringe field formed between the counter and pixel electrodes.

4. A FFS-LCD according to claim 2, wherein the rubbing axis of the second horizontal alignment layer forms an angle of 180° with the rubbing axis of the one of the alignment layer.

5. A FFS-LCD according to claim 1, wherein the distance between the counter electrode and the pixel electrodes is narrower than the distance between the upper substrate and the lower substrates.

6. A FFS-LCD according to claim 1, wherein at least one of the counter electrode and the pixel electrode comprises an opaque materials.

7. A FFS-LCD according to claim 1, wherein one or both of the counter electrode and the pixel electrode comprise a transparent material.

* * * * *